United States Patent
Mittal et al.

(10) Patent No.: US 7,707,144 B2
(45) Date of Patent: Apr. 27, 2010

(54) OPTIMIZATION FOR AGGREGATE NAVIGATION FOR DISTINCT COUNT METRICS

(75) Inventors: Ashish Mittal, Sunnyvale, CA (US); Edward Shaw-Lee Suen, San Francisco, CA (US)

(73) Assignee: Siebel Systems, Inc., San Mateo, CA (US)

( * ) Notice: Subject to any disclaimer, the term of this patent is extended or adjusted under 35 U.S.C. 154(b) by 598 days.

(21) Appl. No.: 10/994,905

(22) Filed: Nov. 22, 2004

(65) Prior Publication Data

US 2005/0138001 A1 Jun. 23, 2005

Related U.S. Application Data

(60) Provisional application No. 60/531,840, filed on Dec. 23, 2003.

(51) Int. Cl.
*G06F 17/30* (2006.01)

(52) U.S. Cl. .................................... 707/3; 707/103 R

(58) Field of Classification Search ............... 707/3, 707/4, 103 R
See application file for complete search history.

(56) References Cited

U.S. PATENT DOCUMENTS

| | | | | |
|---|---|---|---|---|
| 4,918,593 | A * | 4/1990 | Huber | 707/200 |
| 6,374,263 | B1 * | 4/2002 | Bunger et al. | 707/201 |
| 6,775,682 | B1 * | 8/2004 | Ballamkonda et al. | 707/102 |
| 6,836,777 | B2 * | 12/2004 | Holle | 707/101 |
| 7,047,230 | B2 * | 5/2006 | Gibbons | 707/2 |
| 7,107,263 | B2 * | 9/2006 | Yianilos et al. | 707/3 |
| 2002/0059267 | A1 * | 5/2002 | Shah et al. | 707/100 |
| 2005/0177553 | A1 * | 8/2005 | Berger et al. | 707/3 |

* cited by examiner

*Primary Examiner*—Neveen Abel Jalil
*Assistant Examiner*—Son T Hoang
(74) *Attorney, Agent, or Firm*—Campbell Stephenson LLP

(57) ABSTRACT

A method and apparatus for performing a distinct count metric by utilizing aggregate navigation. For a distinct count query of an identifier of a detail table, where the query specifies zero or more restrictions, an aggregate table associated with the detail table is identified. It is then determined whether the aggregate table contains the identifier that is being distinct counted, and if so, whether the identifier is different in every row of the aggregate table. If it is, then the rows of the aggregate table that satisfy the specified restrictions are plain counted to obtain a result for the distinct count query. If the identifier is not different in every row of the aggregate table, a distinct count operation is performed on the rows of the aggregate table that satisfy the specified restrictions to obtain a result for the distinct count query.

21 Claims, 8 Drawing Sheets

Detail Table

| Order No. | Product | Customer | Order Date | Deliver to Zip |
|---|---|---|---|---|
| Order 1 | Product 1 | Customer 1 | Jan 2003 | Zip 1 |
| Order 1 | Product 2 | Customer 1 | Jan 2003 | Zip 2 |
| Order 1 | Product 3 | Customer 1 | Jan 2003 | Zip 1 |
| Order 1 | Product 4 | Customer 1 | Jan 2003 | Zip 3 |
| Order 2 | Product 2 | Customer 1 | Feb 2003 | Zip 1 |
| Order 3 | Product 1 | Customer 2 | Jan 2004 | Zip 1 |
| Order 3 | Product 2 | Customer 2 | Jan 2004 | Zip 1 |
| Order 3 | Product 3 | Customer 2 | Jan 2004 | Zip 4 |
| Order 4 | Product 4 | Customer 2 | Feb 2003 | Zip 3 |
| Order 4 | Product 2 | Customer 2 | Feb 2003 | Zip 2 |

*FIG. 3*

Dimension Table 1

| Product | Brand |
|---|---|
| Product 1 | Brand 1 |
| Product 2 | Brand 1 |
| Product 3 | Brand 2 |
| Product 4 | Brand 2 |

*FIG. 4A*

Dimension Table 2

| Zip | State |
|---|---|
| Zip 1 | State 1 |
| Zip 2 | State 1 |
| Zip 3 | State 2 |
| Zip 4 | State 2 |

*FIG. 4B*

Dimension Table 3

| Month | Year |
|---|---|
| Jan 2003 | 2003 |
| Feb 2003 | 2003 |
| Jan 2004 | 2004 |

*FIG. 4C*

Agg_Table_1

| Order Number | Customer | Date |
|---|---|---|
| Order 1 | Customer 1 | Jan 2003 |
| Order 2 | Customer 1 | Feb 2003 |
| Order 3 | Customer 2 | Jan 2004 |
| Order 4 | Customer 2 | Feb 2003 |

*FIG. 5*

Distinct_Count_Table_1

| Customer | Count (Order Number) |
|---|---|
| Customer 1 | 2 |
| Customer 2 | 2 |

*FIG. 6*

Agg_Table_2

| Order Number | Brand | Date |
|---|---|---|
| Order 1 | Brand 1 | Jan 2003 |
| Order 1 | Brand 2 | Jan 2003 |
| Order 2 | Brand 1 | Feb 2003 |
| Order 3 | Brand 1 | Jan 2004 |
| Order 3 | Brand 2 | Jan 2004 |
| Order 4 | Brand 1 | Feb 2003 |
| Order 4 | Brand 2 | Feb 2003 |

*FIG. 7*

Agg_Table_3

| Date | # of Orders |
|---|---|
| Jan 2003 | 1 |
| Feb 2003 | 2 |
| Jan 2004 | 1 |

*FIG. 8*

Agg_Table_4

| Date | Brand | # of Orders |
|---|---|---|
| Jan 2003 | Brand 1 | 1 (Order 1) |
| Jan 2003 | Brand 2 | 1 (Order 1) |
| Feb 2003 | Brand 1 | 2 (Order 2 and 4) |
| Feb 2003 | Brand 2 | 1 (Order 4) |
| Jan 2004 | Brand 1 | 1 (Order 3) |
| Jan 2004 | Brand 2 | 1 (Order 3) |

*FIG. 9*

Agg_Table_5

| Brand | State | # of Distinct Orders |
|---|---|---|
| Brand 1 | State 1 | 4 (Order 1, 2, 3 and 4) |
| Brand 2 | State 1 | 1 (Order 1) |
| Brand 1 | State 2 | 0 |
| Brand 2 | State 2 | 3 (Order 1, 3 and 4) |

*FIG. 10*

OPTIMIZATION FOR AGGREGATE NAVIGATION FOR DISTINCT COUNT METRICS

RELATED APPLICATIONS

This application claims the benefit of priority under 35 U.S.C. §119(e) of U.S. Provisional Application No. 60/531, 840 filed on Dec. 23, 2003, the entirety of which is incorporated herein by reference.

TECHNICAL FIELD

The described technology is directed generally to database queries and, more particularly, to efficiently performing a distinct count metric.

BACKGROUND

A database is a collection of data. A user typically stores, retrieves and modifies the data in a database using a computer program, such as a database management system (DBMS).

One type of DBMS is a relational data base management system, which stores information in tables. A table is a series of intersecting rows and columns. The rows of a table typically represent records, which are collections of information about particular items, and the columns typically represent fields, which specify particular attributes of a record—e.g., a particular type of data that is contained in each field of the record. Each field contains the data having the particular attribute for the intersecting row and column.

The data stored in the tables of a relational database is commonly accessed and retrieved using a query and analysis tool. For example, a user can use the tool to perform specific operations on the tables, rows, and on individual data elements. One type of operation is an aggregation operation, and one such aggregation function is called a distinct count.

Distinct counts are a very important and common analytics requirement. For a detail table comprised of rows that are divided into columns, a distinct count indicates the number of unique values appearing in a first column of rows that satisfy zero or more conditions on other columns. For example, for an Ordered Items detailed table that contains a row for each item that has been ordered by a customer and, which is divided into a customer ID column, an item ID column, an order date column, and a customer zip code column, a user may wish to count the number of different user IDs contained in the rows containing the zip code 98210.

Conventional, known methods of performing a distinct count metric are unable to use aggregate navigation to perform the distinct count. To the contrary, these conventional methods always obtain the distinct count metric from the most detailed source, resulting in significant performance bottlenecks. A major performance problem is generally encountered while using conventional methods to perform distinct count metrics in an analytics environment because, by their very nature, these conventional methods of distinct counting are more than an order or magnitude slower than other aggregation functions. This problem is compounded when there is more than one distinct count measured in a report.

Accordingly, a technique for performing a distinct count metric that utilizes aggregate navigation will have significant utility.

BRIEF DESCRIPTION OF THE DRAWINGS

FIG. 3 illustrates an example detail table.

FIGS. 4A-C illustrate example dimension tables corresponding to the detail table illustrated in FIG. 3.

FIGS. 5-10 illustrate example aggregate tables corresponding to the detail table illustrated in FIG. 3.

DETAILED DESCRIPTION

Figure 1:
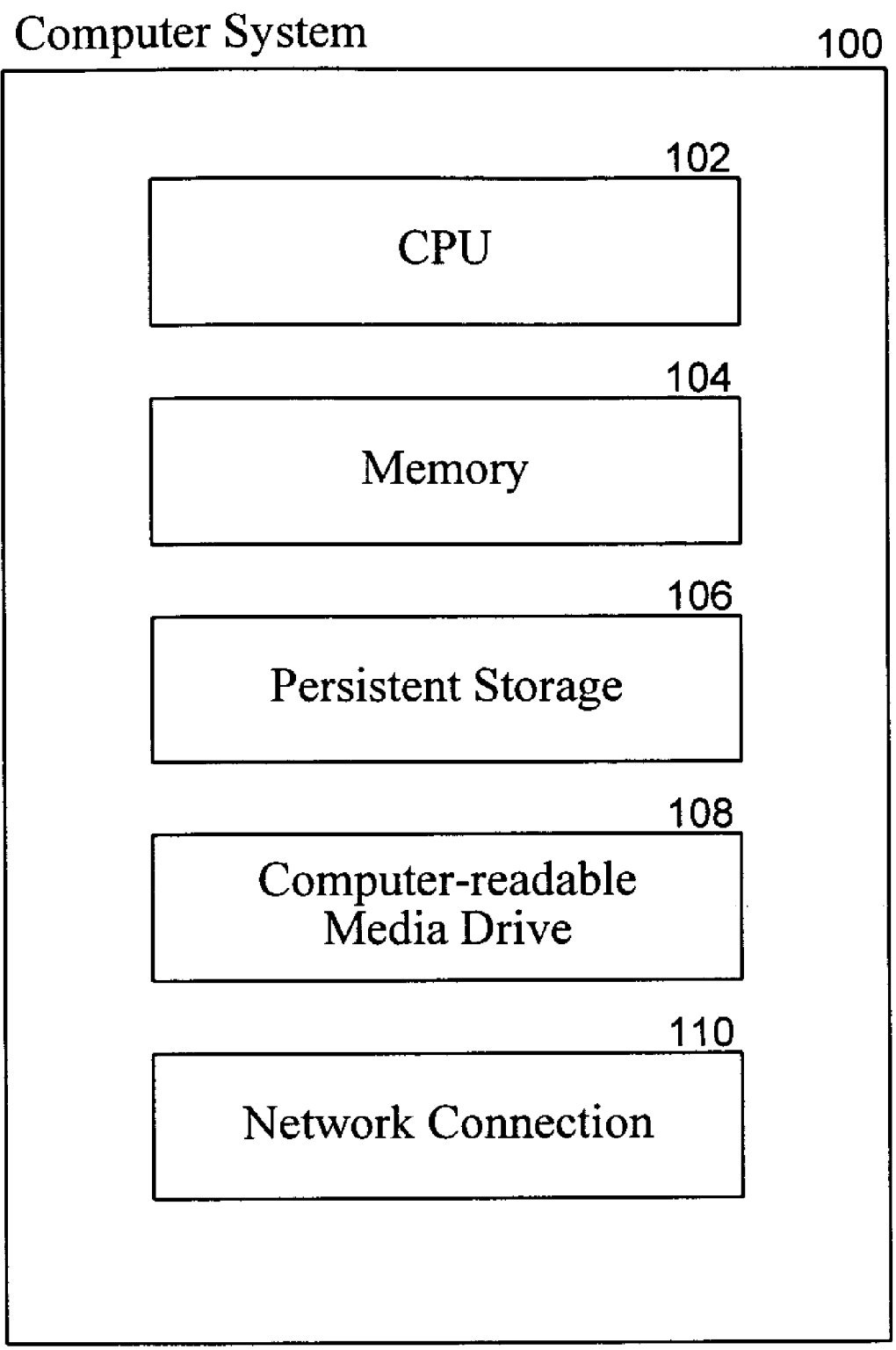
FIG. 1 is a block diagram illustrating selected components typically incorporated in at least some of the computer systems on which the facility executes.

A software facility for performing a distinct count metric that utilizes aggregate navigation ("the facility") is described. In some embodiments, the facility calculates a distinct count metric by performing a count operation on an aggregate table. In some embodiments, the facility calculates a distinct count metric by performing a distinct count operation on a table that is smaller than the detail table typically utilized to conduct the conventional distinct count operation. By eliminating the distinct count altogether for most queries in this manner, and in some other cases, serving up the same answer—i.e., the distinct count metric—by performing a distinct count on a smaller table, the facility provides a significant speedup—e.g., enhancement—in query time when compared to the conventional distinct count performed on a detailed table.

Throughout the description, the following terms will generally have the following meanings:

The term "aggregate table" refers to a table that summarizes or consolidates detail level records from other database tables.

The term "base table" or "detail table" or "fact table" refers to a database table that contains the details data.

The term "count" refers to count of the number of rows in a selected column.

The term "cube" refers to a multidimensional structure that contains dimensions and measures. Dimensions define the structure of the cube. Measures provide the numerical values of interest.

The term "dimension" refers to a structural attribute of a cube, which is an organized hierarchy of categories (levels) that describes data in fact tables. These categories typically describe a similar set of members upon which an analysis is performed. A dimension is a field (column) that you can aggregate over. For example, a time dimension might include levels for year, month, and day.

The term "dimension hierarchy" refers to a set of members in a dimension and their positions relative to one another.

The term "distinct count" or "count distinct" refers to a count of the number of unique rows in a selected column. It refers to a count of the number of rows in a selected column without counting duplicates.

The term "granularity" or "grain" refers to a degree of specificity of information contained in a data element.

The term "hierarchy" refers to a logical tree structure that organizes the members of a dimension such that each member has one parent and zero or more child members.

The term "level" or "category" refers to a name of a set of members in a dimension hierarchy such that all members of the set are at the same distance from the root of the hierarchy. For example, a time dimension might include levels for year, month, and day.

The term "measure" refers to, in a cube, a set of values that are based on a column in the cube's fact table. Measures are the central values that are aggregated and analyzed.

The term "member" refers to an item in a dimension representing one or more occurrences of data. A member can be either unique or nonunique. For example, 2003 and 2004 represent unique members in the year level of a time dimension. In contrast, October represents a nonunique member in the month level of the time dimension because there can be more than one October in the time dimension if it contains data for more than one (1) year.

The term "query" refers to a question a user "asks" a database in order to get information in a useful format.

The term "restriction" refers to a condition or criteria placed on a column. For example, a restriction generally refers to a way to limit a query to only those rows with values for columns that match specific criteria.

The term "table" refers to a two-dimensional object, comprising rows and columns, used to store data in a relational database. It is a presentation of information organized in rows and columns.

In some embodiments, the facility utilizes an aggregate table instead of a detail table to answer a distinct count metric if (1) an aggregate table exists that contains an identifier—i.e., a measure—that is being aggregated—i.e., distinct counted—or (2) if the rows of the aggregate table contain counts of the identifier that is being distinct counted instead of the identifier itself.

In the case where an aggregate table exists that contains the identifier that is being aggregated (case 1):

a. If the identifier being distinct counted is unique in the aggregate table, then the facility applies the count operator to the aggregate table instead of the much slower distinct count operator—that is, if it is assured that the identifier being distinct counted is different in every row of the aggregate table. In this instance, a master aggregate table for master/detail relationships where COUNT DISTINCT is required for the detail, but not the master. One example is Order/OrderDetails, where the # of unique orders by product has to be a distinct count as it joins to Product via OrderDetails (i.e., COUNT DISTINCT on the OrderDetails table). In contrast, aggregating on every other dimension only requires a much faster count operation (i.e., COUNT on the Order header table).

b. If the identifier being distinct counted is not unique in the aggregate table, then the facility applies the distinct count operator to the aggregate table. In this instance, the distinct count key is stored as part of the aggregate table. For example, suppose a user is interested in the # of unique customers who have bought a particular product over the past few months. An aggregate table having the dimensions CustomerID, ProductID, and MonthID, can be used to determine the # of unique customers who have bought a particular product over past few months by running the COUNT DISTINCT over the CustomerID to support aggregations at or above the grain of [Product, Month]. It will be appreciated that there are scenarios that one of ordinary skill in the art can envisage where this gives orders of magnitude faster performance versus performing a distinct count using the Order/OrderItem base or fact tables.

In the case where an aggregate table exists, but the rows of the aggregate table contain counts of the identifier that is being discounted instead of the identifier itself (case 2):

a. If the aggregate table has dimensionality involving only dimensions dependent on the counted identifier, the facility sums the counts from the appropriate rows of the aggregate table to obtain the correct distinct count. In this instance, the COUNT DISTINCT is stored in an aggregate table, and any query at or above the grain of the aggregate table can exploit the aggregate by summing on the pre-computed COUNT DISTINCT numbers. One example where this is useful is for counting the number of unique orders. Consider a subject area with the following dimensions: Time, Customer, Product, Channel. Because of schema semantics, the # of Orders measure can be summed up on all dimensions except product (i.e., a given order is on a single date, for a single customer, sold over a single channel, whereas multiple products may be associated with that order). Under this scenario, we can create an aggregate table at the grain of All Product and across any grain of the other dimensions—e.g. Month, CustomerZip, Channel. Any queries at or above the grain of the aggregate table would now hit this aggregate table and sum on the pre-computed distinct count. For example, a query showing the # of distinct orders generated by the Web channel for the most recent quarter would hit this aggregate table.

b. If the aggregate table has some dimensions dependent on the identifier being distinct counted, and some dimensions independent of the identifier being distinct counted, then as long as the query matches in level the level of the aggregate for the independent levels, the facility sums the count to obtain the correct distinct count. One example may be when the query is for a distinct count of customers, and an aggregate table has a count of customers by product and zip (of the customers' primary address). We can then obtain a distinct count of the # of customers for a state by adding the customers in each zip for that state (because no customer can simultaneously have primary addresses in two states). However, we can not obtain a distinct count of the # of customer for brands by adding across product (since a customer may buy more than one product in a brand).

c. If all dimensions in the aggregate table are independent of the identifier being distinct counted, then the facility uses the aggregate if and only if the levels of the query match the level of the table exactly. In this instance, the COUNT DISTINCT is stored as part of the aggregate table, but only supports an exact level/grain match. For example, an aggregate table having the dimensions ProductID, MonthID, and NUM_CUSTOMERS, can only be used for queries at the grain of [Product, Month], but cannot be used for a query at the grain of [Product, Quarter]. Stated another way, the latter query misses the aggregate table.

In one embodiment, the aforementioned functionality is supported by a new metadata object (AOverrideAggrRule), a relationship object between measures (AMeasureDefn) and logical table sources (ALogicalTableSource). In other words, the facility can specify an override aggregation expression for a given logical table source (LTS). If the facility does not specify any override, then the current (i.e., conventional distinct counting) behavior prevails. If the facility specifies an override for an LTS, then that aggregation rule is applied.

For example, the LTS override expression for case 1.b above is COUNT(DISTINCT "# of Customers"). The LTS override for case 1.a above is COUNT("# of Orders"). The LTS override for case 2.a above is SUM("# of Orders").

The various embodiments of the facility and its advantages are best understood by referring to FIGS. 1-11 of the drawings. The elements of the drawings are not necessarily to scale, emphasis instead being placed upon clearly illustrating the principles of the invention. Throughout the drawings, like numerals are used for like and corresponding parts of the various drawings.

FIG. 1 is a block diagram illustrating selected components typically incorporated in at least some of the computer systems on which the facility executes. These computer systems 100 may include one or more central processing units ("CPUs") 102 for executing computer programs; a computer memory 104 for storing programs and data-including data structures—while they are being used; a persistent storage device 106, such as a hard drive, for persistently storing programs and data; a computer-readable media drive 108, such as a CD-ROM drive, for reading programs and data stored on a computer-readable medium; and a network connection 110 for connecting the computer system to other computer systems, such as via the Internet, to exchange programs and/or data-including data structures.

The facility may be described in the general context of computer-readable instructions, such as program modules, executed by computer systems 100 or other devices. Generally, program modules include routines, programs, objects, components, data structures, etc. that perform particular tasks or implement particular abstract data types. Memory 104 and persistent storage device 106 are computer-readable media that may contain instructions that implement the facility. It will be appreciated that memory 104 and persistent storage 106 may have various other contents in addition to the instructions that implement the facility.

It will be appreciated that computer systems 100 may include one or more display devices for displaying program output, such as video monitors or LCD panels, and one or more input devices for receiving user input, such as keyboards, microphones, or pointing devices such as a mouse. While computer systems 100 configured as described above are typically used to support the operation of the facility, it will be appreciated that the facility may be implemented using devices of various types and configurations, and having various components.

In the discussion that follows, embodiments of facility are described in conjunction with a variety of illustrative examples. It will be appreciated that the embodiments of facility may be used in circumstances that diverge significantly from these examples in various respects.

Figure 2A:
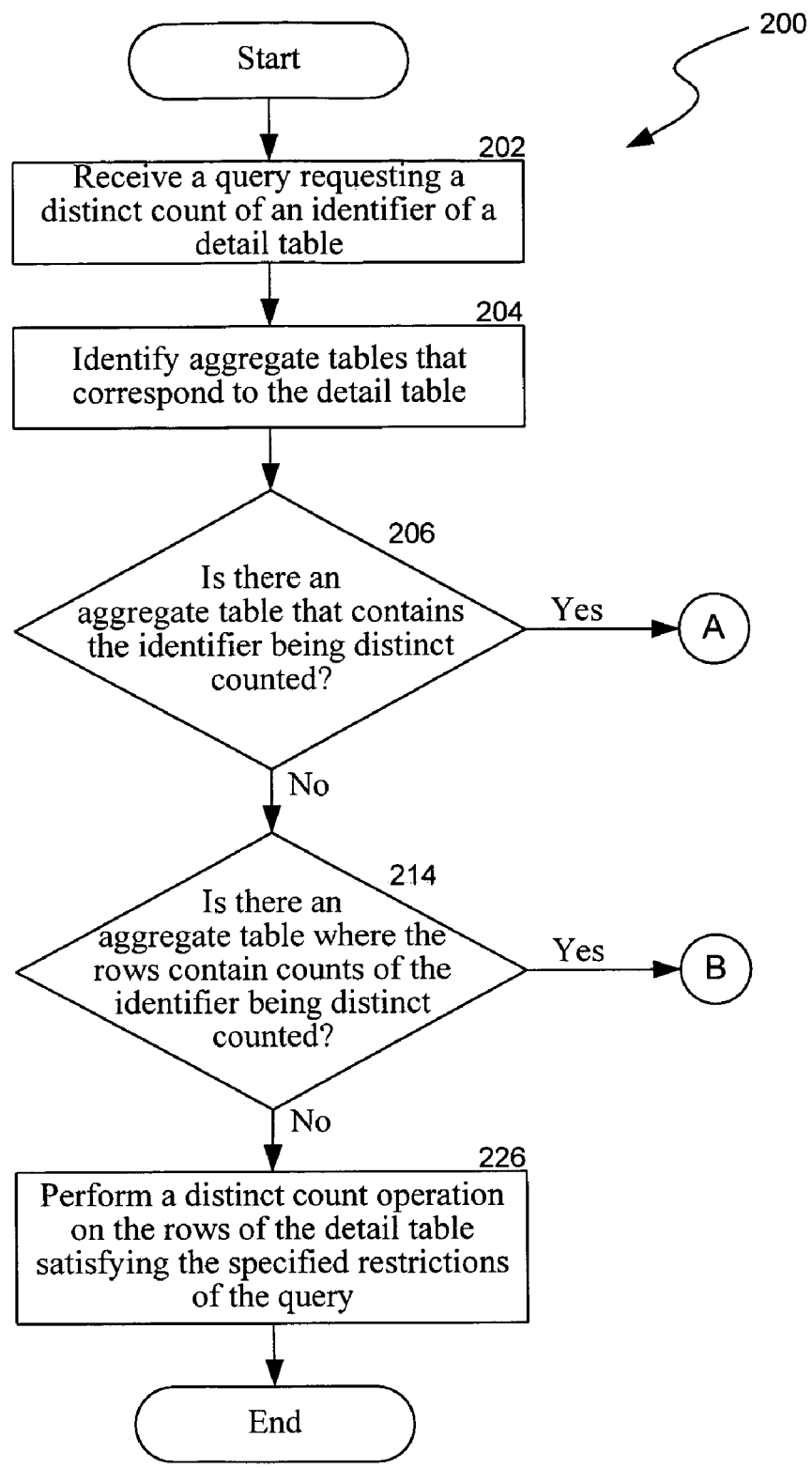
FIGS. 2A-C illustrate a flow chart of a method by which the facility performs a distinct count metric, according to some embodiments.
Figure 2B:
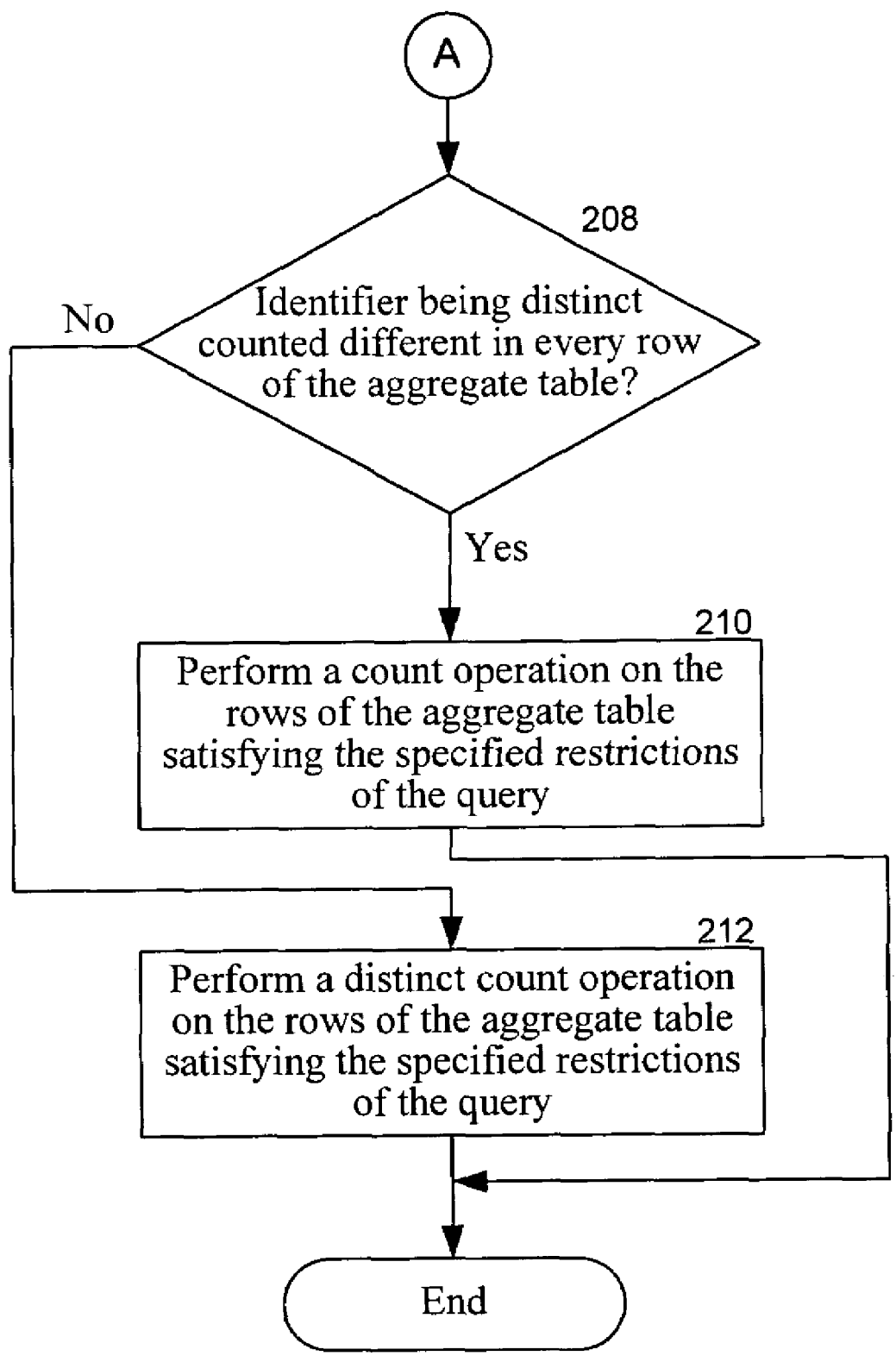
Figure 2C:
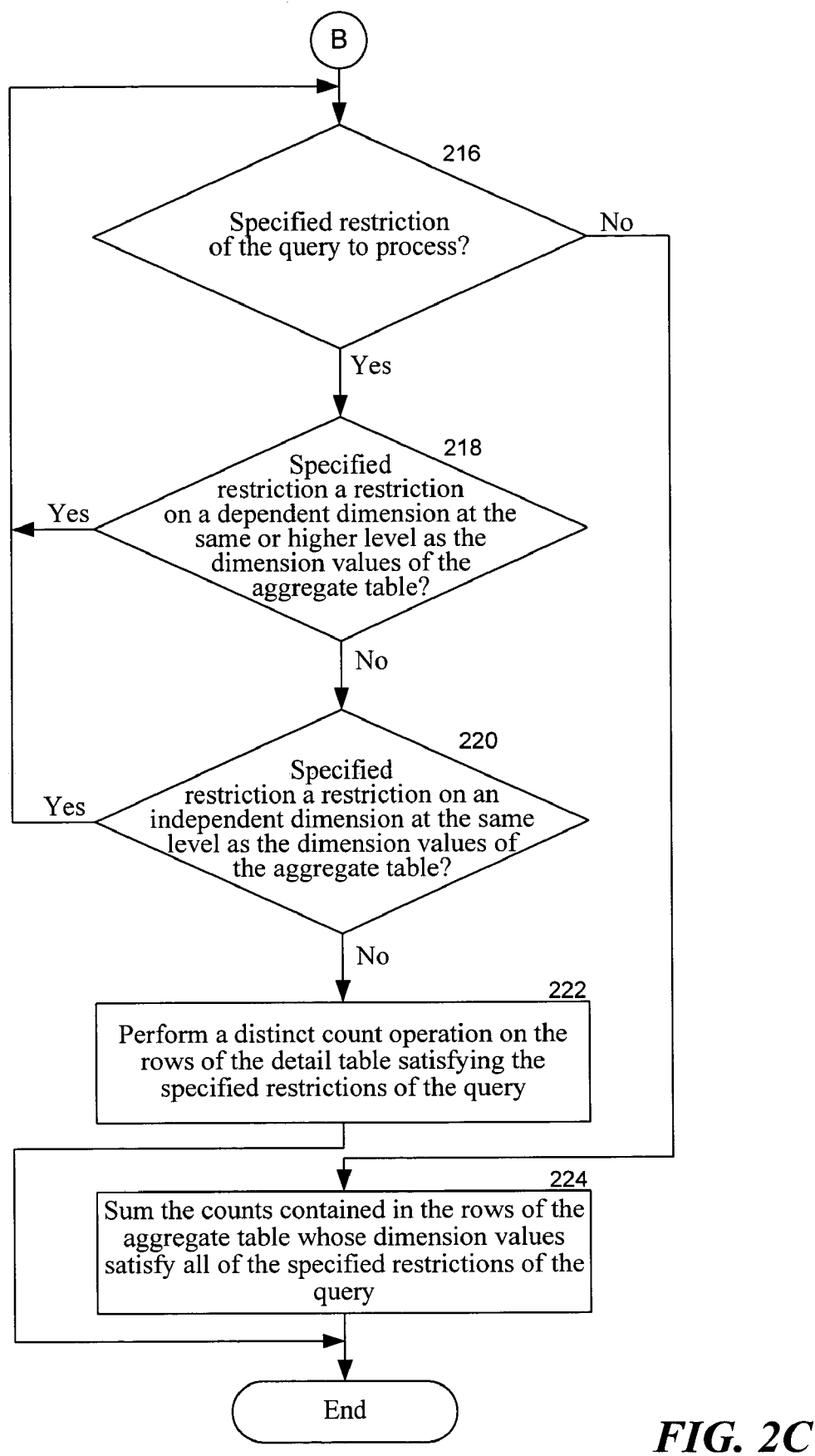

FIGS. 2A-C illustrate a flow chart of a method 200 by which the facility performs a distinct count metric, according to some embodiments. At step 202, the facility receives a query requesting a distinct count of an identifier of a detail table. The query may include one or more restrictions. At step 204, the facility identifies the aggregate tables that correspond to the detail table. At step 206, the facility checks the identified aggregate tables to determine whether there is an aggregate table that contains the identifier that is being distinct counted.

If there is an aggregate table that contains the identifier being distinct counted, then, at step 208, the facility checks each row of the aggregate table to determine whether the identifier being distinct counted is different in every row of the aggregate table. If the identifier being distinct counted is different in every row of the aggregate table, then, at step 210, the facility performs a count operation on the rows of the aggregate table that satisfy the specified restrictions of the query to derive the requested distinct count metric. Here, the facility provides a performance enhancement by utilizing aggregate navigation to derive the distinct count metric. Stated differently, the facility provides the performance enhancement by performing the faster count operation on a smaller aggregate table.

Otherwise, if the identifier being distinct counted is not different in every row of the aggregate table, then, at step 212, the facility performs a distinct count operation on the rows of the aggregate table that satisfy the specified restrictions of the query to derive the requested distinct count metric. Here, the facility still provides a performance enhancement by utilizing aggregate navigation to derive the distinct count metric. Stated differently, the facility provides the performance enhancement by performing the distinct count operation on a smaller aggregate table.

If, at step 206, the facility determines that no aggregate table contains the identifier being distinct counted, then, at step 214, the facility checks to determine whether there is an aggregate table where the rows of the aggregate table contain counts of the identifier being distinct counted. Each count indicates the number of times the identifier being distinct counted occurs in the detail table for different combinations of dimension values. Each dimension value is at a particular level of its dimension. If there is an aggregate table where the rows of the aggregate table contain counts of the identifier being distinct counted, then, at step 216, the facility determines whether there is a specified restriction of the query to process. If there is a specified restriction to process, then, at step 218, the facility checks to determine whether the specified restriction currently being processed is a restriction on a dependent dimension at the same or higher level as the dimension values of the aggregate table.

If the specified restriction currently being processed is a restriction on a dependent dimension at the same or higher level as the dimension values of the aggregate table, then the facility returns to step 216 to process another restriction of the query to process. Otherwise, if the specified restriction currently being processed is not a restriction on a dependent dimension at the same or higher level as the dimension values of the aggregate table, then, at step 220, the facility checks to determine whether the specified restriction currently being processed is a restriction on an independent dimension at the same level as the dimension values of the aggregate table.

If the specified restriction currently being processed is a restriction on an independent dimension at the same level as the dimension values of the aggregate table, then the facility returns to step 216 to process another restriction of the query to process. Otherwise, if the specified restriction currently being processed is a restriction on an independent dimension not at the same level as the dimension values of the aggregate table, then, at step 222, the facility performs a distinct count operation on the rows of the detail table that satisfy the specified restrictions of the query to derive the requested distinct count metric. In this instance, there is no performance enhancement because the facility cannot utilize aggregate navigation to derive the distinct count metric.

If, at step 216, the facility determines that there are no more specified restrictions of the query to process, then, at step 224, the facility sums the counts contained in the rows of the aggregate table whose dimension values satisfy all of the specified restrictions of the query to derive the requested distinct count metric. Stated another way, as long as the restrictions in the query match in level the level of the independent dimensions in the aggregate table, the count can be summed to give the correct distinct count answer. Here, the facility checked each restriction contained in the query and determined that each of the restrictions was either a restriction on a dependent dimension at the same level or at a higher level than the dimension values of the aggregate table, or a restriction on an independent dimension at the same level as the dimension values of the aggregate table. The facility can then add across dependent dimensions at the same (i.e., exact) level as or a higher level than the dimension values of the aggregate table, and independent dimensions at the same level as the dimension values of the aggregate table.

Here, the facility determined that either (1) the aggregate table contained only dimensions dependent on the identifier being distinct counted (step 218), and that the counts from the appropriate rows of the aggregate table—i.e., the rows of the aggregate table whose dimension values satisfy all of the specified restrictions of the query—can be summed to obtain the correct distinct count (step 224); (2) the aggregate table contained some dimensions dependent on the identifier being distinct counted and some dimensions independent of the identifier being distinct counted (step 218 and step 220), and that the counts from the appropriate rows of the aggregate table—i.e., the rows of the aggregate table whose dimension values satisfy all of the specified restrictions of the query—can be summed to obtain the correct distinct count (step 224); or all the dimensions in the aggregate table are independent of the identifier being distinct counted (step 220), and thus the aggregate may be used if and only if the levels of the query match the level of the table exactly. Thus, the facility provides a performance enhancement by utilizing aggregate navigation to derive the distinct count metric. Stated differently, the facility provides the performance enhancement by performing the faster sum operation on the appropriate rows of a smaller aggregate table.

If, at step 214, the facility determines that there are no aggregate tables having rows that contain counts of the identifier being distinct counted, then, at step 226, the facility performs a distinct count operation on the rows of the detail table that satisfy the specified restrictions of the query to derive the requested distinct count metric. In this instance, there is no performance enhancement because the facility cannot utilize aggregate navigation to derive the distinct count metric.

Those of ordinary skill in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps without detracting from the essence of the invention.

Various aspects of method 200 will be further illustrated in conjunction with the following examples. It will be appreciated that the following examples are provided for illustration purposes and are not to be considered in any manner exhaustive or complete. The examples presume a database comprising a detail table 30 as illustrated in FIG. 3, and the dimension tables corresponding to detail table 30 as illustrated in FIGS. 4A-C. Each of the dimension tables contain attributes that describe the records in table 30.

As illustrated, detail table 30 contains ten records of orders placed by customers. Each record is depicted as having five columns or dimensions labeled "Order Number," "Product," "Customer," "Order Date," and "Deliver to Zip." A first dimension is "dependent" on a second dimension if a value in the second dimension can have or be associated with only one value in the first dimension. Otherwise, if a value in the second dimension can have or be associated with multiple values in the first dimension, then the first dimension is "independent" of the second dimension. In table 30, "Customer" is dependent on "Order Number" because each order is associated with or placed by only one customer. Likewise, "Order Date" is dependent on "Order Number" because each order is associated with or placed on a single date. In contrast, "Product" is independent of "Order number" because each order can be for multiple products. Similarly, "Deliver to Zip" is independent of "Order Number" because the products in an order can be delivered to multiple zip codes—e.g., an order can be for multiple products, where some of the products are delivered to a first zip code while the remaining products are delivered are delivered to a second, different zip code.

Dimension Table 1 (FIG. 4A) contains information regarding the "Product" dimension in table 30, and illustrates a hierarchy that further separates a product into its brand. Dimension Table 2 (FIG. 4B) contains information regarding the "Deliver to Zip" dimension in table 30, and illustrates a hierarchy that further separates the zip into its corresponding state. Dimension Table 3 (FIG. 4C) contains information regarding the "Order Date" dimension in table 30, and illustrates a hierarchy that further separates the month in the order date to its corresponding year.

Example 1

Identifier Being Distinct Counted is Present and Unique in an Aggregate Table—Count Operation is Used By way of example, a user may be interested in obtaining a distinct count of the number of unique orders placed by each customer as recorded in detail table 30. Here, the facility may receive from the user a string, "Request: customer, # of orders," which is understood by the facility to be a distinct count query for the number of unique orders placed by each customer (step 202). The facility determines that "customer" is a restriction on the distinct count query. The facility also determines that the distinct count query for the number of unique orders can be obtained by performing a distinct count of the identifier "order number" in detail table 30.

Assuming that the facility identifies an Agg_Table_1, as illustrated in FIG. 5, as an aggregate table that is associated with detail table 30 (step 204), and which contains the identifier "order number" that is necessary to answer the query—e.g., is an aggregation of the identifier being distinct counted—(step 206), the facility checks Agg_Table_1 to see if the identifier "order number" is different in every row of Agg_Table_1 (step 208). As depicted, Agg_Table_1 contains three columns, a first column that identifies the order number, a second column that identifies the customer, and a third column that indicates the date. Seeing that the identifier "order number" is different in every row of Agg_Table_1, the facility concludes that it can answer the distinct count query by counting the rows of Agg_Table_1 that satisfy the restriction—i.e., customer (step 210).

Assuming that the facility either incorporates the functions and features of a Structured Query Language (SQL) processor, or is coupled to an SQL processor, the facility can convert the received string to the following SQL expression to determine the requested distinct count of the number of unique orders placed by each customer:

SELECT customer
COUNT(order number)
FROM Agg_Table_1
GROUP BY customer

In one embodiment, the SQL processor component of the facility processes the above SQL expression and generates a Distinct_Count_Table_1, as illustrated in FIG. 6, which contains the distinct counts of the number of unique orders placed by each customer. As depicted, Distinct_Count_Table_1 contains two columns, one column that identifies each customer, and another column that contains a distinct count of the number of orders placed. As can be seen in Distinct_Count_Table_1, a Customer 1 placed two orders, and a Customer 2 placed two orders.

The facility can answer other distinct count queries by applying a count operator on Agg_Table_1. For example, the user may have requested a distinct count of the number of unique orders placed each year as recorded in detail table 30, and submitted a string "Request: year, # of orders" to the facility. The facility interprets the received string to be a distinct count query for the number of unique orders placed each year, and determines that the identifier being distinct counted is "order number" and a restriction on the distinct count query is "year."

Seeing that the identifier "order number" is different in every row of Agg_Table_1, the facility concludes that it can answer the distinct count query by counting the rows of Agg_Table_1 that satisfy the restriction—i.e., year. Accordingly, the facility converts the received string to the following SQL expression:

SELECT year
COUNT(order number)
FROM Agg_Table_1
GROUP BY year

The above SQL expression is processed to ascertain that there were three orders placed in 2003, and one order placed in 2004.

In a similar manner, a distinct count of the number of unique orders placed by each customer in January, 2003, as recorded in detail table 30 can be obtained by performing a count operation on Agg_Table_1. This distinct count request can be represented by a string "Request: customer, # of orders where date=January 2003." The facility determines that the identifier being distinct counted is "order number" and the restrictions on the distinct count query are "customer" and "date=January 2003."

Seeing that the identifier "order number" is different in every row of Agg_Table_1, the facility concludes that it can answer the distinct count query by counting the rows of Agg_Table_1 that satisfy the restrictions—i.e., customer and date=January 2003. Accordingly, the facility converts the received string to the following SQL expression:

SELECT customer
COUNT(order number)
FROM Agg_Table_1
WHERE date='January 2003'
GROUP BY year The above SQL expression is processed to ascertain that Customer1 placed one order in January 2003, and Customer2 placed no (zero) orders in January 2003.

Example 2

Identifier Being Distinct Counted is Present but not Unique in an Aggregate Table—Distinct Count Operation is Used By way of example, a user may be interested in obtaining a distinct count of the number of unique orders by each brand as recorded in detail table 30. Here, the facility may receive from the user a string, "Request: brand, # of orders," which is understood by the facility to be a distinct count query for the number of unique orders by each brand (step 202). The facility determines that "brand" is a restriction on the distinct count query. The facility also determines that the distinct count query for the number of unique orders can be obtained by performing a distinct count of the identifier "order number" in detail table 30.

Assuming that the facility identifies an Agg_Table_2, as illustrated in FIG. 7, as an aggregate table that is associated with detail table 30 (step 204), and which contains the identifier "order number" that is necessary to answer the query—e.g., is an aggregation of the identifier being distinct counted—(step 206), the facility checks Agg_Table_2 to see if the identifier "order number" is different in every row of Agg_Table_2 (step 208). As depicted, Agg_Table_2 contains three columns, a first column that identifies the order number, a second column that identifies the brand, and a third column that indicates the date. Seeing that the identifier "order number" is not different in every row of Agg_Table_2, the facility concludes that it can answer the distinct count query by distinct counting the rows of Agg_Table_2 that satisfy the restriction—i.e., brand (step 212). Accordingly, the facility converts the received string to the following SQL expression:

SELECT brand
COUNT(DISTINCT order number)
FROM Agg_Table_2
GROUP BY brand

The above SQL expression is processed to ascertain that there were four orders placed for brand 1, and three orders placed for brand 2.

The facility can answer other distinct count queries by applying a count operator on Agg_Table_2. For example, the user may have requested a distinct count of the number of unique orders placed each year as recorded in detail table 30, and submitted a string "Request: year, # of orders" to the facility. The facility interprets the received string to be a distinct count query for the number of unique orders placed each year, and determines that the identifier being distinct counted is "order number" and a restriction on the distinct count query is "year."

Seeing that the identifier "order number" is not different in every row of Agg_Table_2, the facility concludes that it can answer the distinct count query by distinct counting the rows of Agg_Table_2 that satisfy the restriction—i.e., year. Accordingly, the facility converts the received string to the following SQL expression:

SELECT year
COUNT(DISTINCT order number)
FROM Agg_Table_2
GROUP BY year

The above SQL expression is processed to ascertain that there were three orders placed in 2003, and one order placed in 2004.

Example 3

Aggregate Table Does not Contain Identifier Being Distinct Counted—Contains Only Dependent Dimensions By way of example, a user may be interested in obtaining a distinct count of the number of unique orders placed each year as recorded in detail table 30. Here, the facility may receive from the user a string, "Request: year, # of orders," which is understood by the facility to be a distinct count query for the number of unique orders placed each year (step 202). The facility determines that "year" is a restriction on the distinct count query. The facility also determines that the distinct count query for the number of unique orders can be obtained by performing a distinct count of the identifier "order number" in detail table 30.

Assuming that the facility identifies an Agg_Table_3, as illustrated in FIG. 8, as an aggregate table that is associated with detail table 30 (step 204), and where the rows contain counts of the identifier "order number" that is being distinct counted—e.g., is an aggregation of the identifier being distinct counted—(step 208), the facility checks Agg_Table_3 to determine the types of dimensions contained in Agg_Table_3. As depicted, Agg_Table_3 contains two columns, a first column that indicates the date, and a second column that contains a count of the number of orders. In detail table 30, an order can have only one customer and one date. If an aggregate table contains only dependent dimensions, the facility can sum across the dependent dimensions to derive the distinct count. With regard to Agg_Table_3, the facility determines that Agg_Table_3 contains only dependent dimensions, and the restriction "year" is a restriction on a dependent dimension—i.e., date—at the same or higher level as the values—e.g., month year—in Agg_Table_3 (step 218). The dimension year is at a higher level than the date—e.g., month and year—as indicated by Dimension Table 3 (FIG. 4C). Therefore, the facility concludes that it can answer the distinct count query by summing the counts—i.e., the count of the number of orders—contained in the rows of Agg_Table_3 whose dimension values—i.e., date values—satisfy all of the restrictions in the query—i.e., year (step 224). Accordingly, the facility converts the received string to the following SQL expression:

SELECT year
SUM(# of orders)
FROM Agg_Table_3
GROUP BY year

The above SQL expression is processed to ascertain that there were three orders placed in 2003, and one order placed in 2004.

Example 4

Aggregate Table does not Contain Identifier being Distinct Counted—Contains Some Dependent Dimensions and Some Independent Dimensions By way of example, a user may be interested in obtaining a distinct count of the number of unique orders for each combination of date and brand as recorded in detail table 30. Here, the facility may receive from the user a string, "Request: date, brand, # of orders," which is understood by the facility to be a distinct count query for the number of unique orders placed for each combination of date and brand (step 202). The facility determines that "date" and "brand" are restrictions on the distinct count query. The facility also determines that the distinct count query for the number of unique orders can be obtained by performing a distinct count of the identifier "order number" in detail table 30.

Assuming that the facility identifies an Agg_Table_4, as illustrated in FIG. 9, as an aggregate table that is associated with detail table 30 (step 204), and where the rows contain counts of the identifier "order number" that is being distinct counted—e.g., is an aggregation of the identifier being distinct counted—(step 208), the facility checks Agg_Table_4 to determine the types of dimensions contained in Agg_Table_4. As depicted, Agg_Table_4 contains three columns, a first column that indicates the date, a second column that indicates the brand, and a third column that contains a count of the number of orders. In detail table 30, an order can have only one date, but can be for multiple products, which can be for multiple brands as indicated in Dimension Table 1 (FIG. 4A). If an aggregate table contains some dimensions dependent on the identifier "order number" and some dimensions independent on the identifier, then as long as the query matches in level the level of the aggregate table for the independent dimensions, the facility can sum the count to derive the distinct count. With regard to Agg_Table_4, the facility determines that Agg_Table_4 contains both a dependent dimension and an independent dimension. The facility also determines that the restriction "date" is a restriction on a dependent dimension—i.e., date—at the same or higher level as the values—e.g., month year—in Agg_Table_4 (step 218), and the restriction "brand" is a restriction on an independent dimension—i.e., brand—at the same level as the values—e.g., Brand 1 or Brand 2—in Agg_Table_4 (step 220). Therefore, the facility concludes that it can answer the distinct count query by summing the counts—i.e., the count of the number of orders—contained in the rows of Agg_Table_4 whose dimension values—i.e., date and brand values—satisfy all of the restrictions in the query—i.e., combination of date and brand (step 224). Accordingly, the facility converts the received string to the following SQL expression:

SELECT date, brand
SUM(# of orders)
FROM Agg_Table_4

The above SQL expression is processed to ascertain that there were one order placed for the combination of January 2003 and Brand 1; one order placed for the combination of January 2003 and Brand 2; two orders placed for the combination of February 2003 and Brand 1; one order placed for the combination of February 2003 and Brand 2; one order placed for the combination of January 2004 and Brand 1; and one order placed for the combination of January 2004 and Brand 2.

The facility can answer other distinct count queries by applying a count operator on Agg_Table_4. For example, the user may have requested a distinct count of the number of unique orders for each combination of brand and year as recorded in detail table 30, and submitted a string "Request: brand, year, # of orders" to the facility. The facility interprets the received string to be a distinct count query for the number of unique orders placed each combination of year and brand, and determines that the identifier being distinct counted is "order number" and a restrictions on the distinct count query are "brand" and "year."

The facility determines that Agg_Table_4 contains both a dependent dimension and an independent dimension. The facility also determines that the restriction "year" is a restriction on a dependent dimension—i.e., date—at the same or higher level as the values—e.g., month year—in Agg_Table_4 (step 218), and the restriction "brand" is a restriction on an independent dimension—i.e., brand—at the same level as the values—e.g., Brand 1 or Brand 2—in Agg_Table_4 (step 220). Because the facility will be summing only across date, which is a dependent dimension, the facility concludes that it can answer the distinct count query by summing the counts—i.e., the count of the number of orders—contained in the rows of Agg_Table_4 whose dimension values—i.e., date and brand values—satisfy all of the restrictions in the query—i.e., combination of year and brand (step 224). Accordingly, the facility converts the received string to the following SQL expression:

SELECT brand, year
SUM(# of orders)
FROM Agg_Table_4
GROUP BY brand, year

The above SQL expression is processed to ascertain that there were three orders placed for the combination of Brand 1 and 2003; two orders placed for the combination of Brand 2 and 2003; one order placed for the combination of Brand 1 and 2004; and one order placed for the combination of Brand 2 and 2004.

In contrast, the facility cannot answer a query for a distinct count of the number of unique orders placed each year—e.g., Request: year, # of orders—from Agg_Table_4 because this would require aggregating across brand, an independent dimension. Stated another way, there are no rows of Agg_Table_4 whose dimension values—i.e., date and brand values—satisfy all of the specified restrictions of the query—i.e., year. Here, the query is missing a restriction for brand, and independent dimension. In this instance, the facility performs a distinct count operation on detail table 30.

Example 5

Aggregate Table does not Contain Identifier being Distinct Counted—Contains Only Independent Dimensions By way of example, a user may be interested in obtaining a distinct count of the number of unique orders for each combination of brand and state as recorded in detail table 30. Here, the facility may receive from the user a string, "Request: brand, state, # of orders," which is understood by the facility to be a distinct count query for the number of unique orders placed for each combination of brand and state (step 202). The facility determines that "brand" and "state" are restrictions on the distinct count query. The facility also determines that the distinct count query for the number of unique orders can be obtained by performing a distinct count of the identifier "order number" in detail table 30.

Assuming that the facility identifies an Agg_Table_5, as illustrated in FIG. 10, as an aggregate table that is associated with detail table 30 (step 204), and where the rows contain counts of the identifier "order number" that is being distinct counted—e.g., is an aggregation of the identifier being distinct counted—(step 208), the facility checks Agg_Table_5 to determine the types of dimensions contained in Agg_Table_5. As depicted, Agg_Table_5 contains three columns, a first column that indicates the brand, a second column that indicates the state, and a third column that contains a distinct count of the number of orders. In detail table 30, an order can be for multiple products, which can be for multiple brands as indicated in Dimension Table 1 (FIG. 4A), and can be shipped to multiple zip codes, which correspond to multiple states as indicated in Dimension Table 2 (FIG. 4B). If an aggregate table contains only dimensions independent of the identifier "order number" that is being distinct counted, the aggregate—i.e., distinct count—in the aggregate table can be used if and only if the levels of the restrictions of the query match the level of the dimensions in the aggregate table exactly. With regard to Agg_Table_5, the facility determines that Agg_Table_5 contains only independent dimensions. The facility also determines that the restriction "brand" is a restriction on an independent dimension—i.e., brand—at the same level, and the restriction "state" is a restriction on an independent dimension—i.e., state—at the same level. Therefore, the facility concludes that it can answer the distinct count query using the distinct count of the number of orders contained in Agg_Table_5. Accordingly, the facility converts the received string to the following SQL expression:

SELECT brand, state, # of distinct Orders
FROM Agg_Table_5

The above SQL expression is processed to ascertain that there were four orders placed for the combination of Brand 1 and State 1; one order placed for the combination of Brand 2 and State 1; no (zero) orders placed for the combination of Brand 1 and State 2; and three orders placed for the combination of Brand 2 and State 2.

Similarly, the facility can answer a query for a distinct count of the number of unique orders for each combination of brand and State 1—e.g., Request: brand, state, # of orders where state="State 1"—from Agg_Table_5 by using the following SQL expression:

SELECT brand, state, # of distinct Orders
FROM Agg_Table_5
WHERE state='State 1'

The above SQL expression is processed to ascertain that there were four orders placed for the combination of Brand 1 and State 1, and one order placed for the combination of Brand 2 and State 1.

In contrast, the facility cannot answer a query for a distinct count of the number of unique orders for each brand—e.g., Request: brand, # of orders—from Agg_Table_5 because this would require aggregating across state, an independent dimension. Stated another way, the levels of the restrictions in the query do not exactly match the level of the dimensions of Agg_Table_5. In this instance, the facility performs a distinct count operation on detail table 30.

Figure 11:
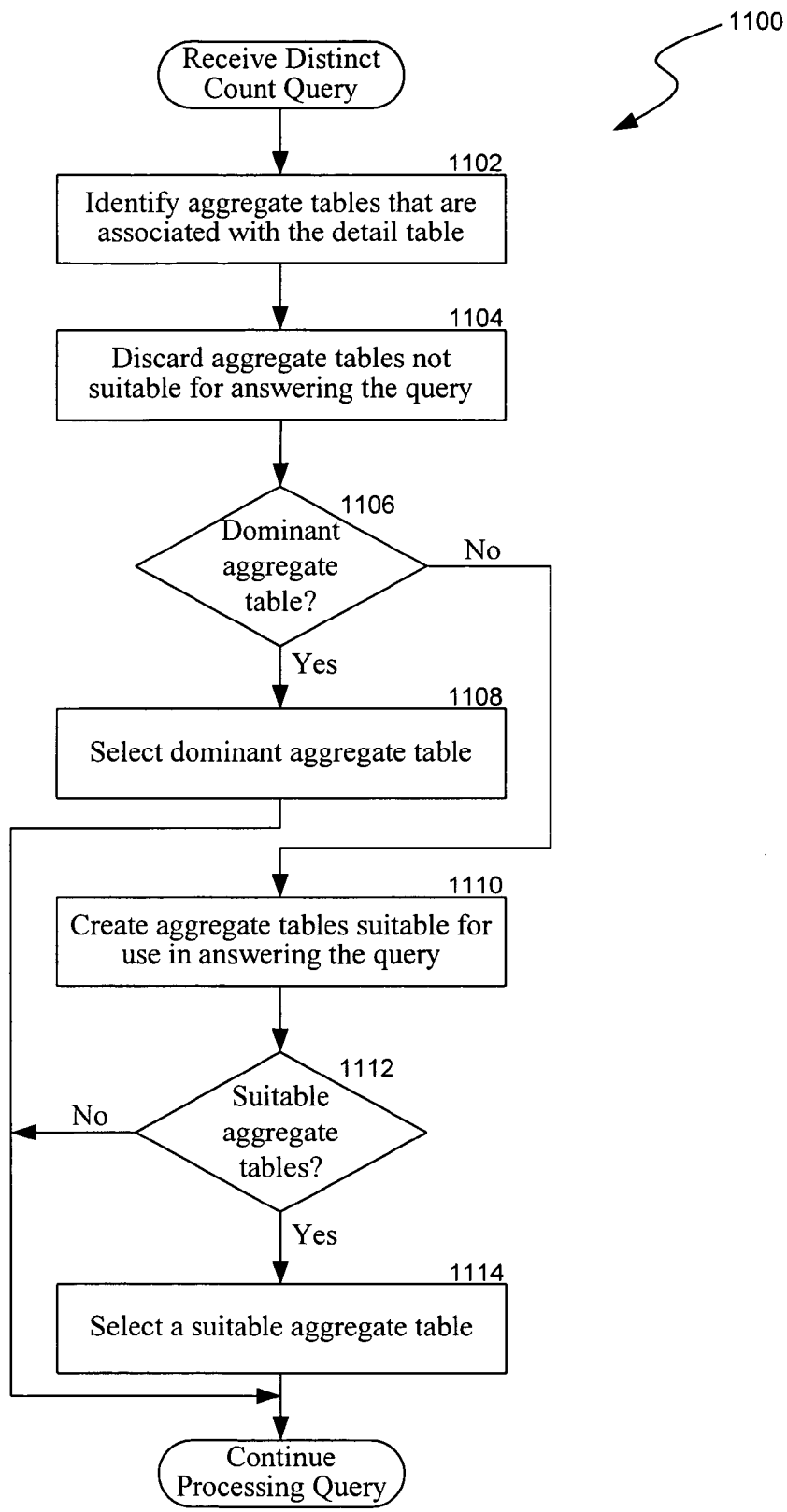
FIG. 11 illustrates a flow chart of a method by which the facility identifies an aggregate table to use in answering a distinct count query, according to some embodiments.

FIG. 11 illustrates a flow chart of a method 1100 by which the facility identifies an aggregate table to use in answering a distinct count query, according to some embodiments. By way of example, the facility may have received a query requesting a distinct count of an identifier in a detail table. At step 1102, the facility identifies the aggregate tables associated with the detail table to which the query applies. In particular, the facility identifies the aggregate tables that are aggregations of the queried identifier. In one embodiment, the facility may identify these aggregate tables from their names. For example, a database administrator may have implemented a naming convention that indicates a relationship between an aggregate table and its related detail table. In this instance, the name of the aggregate table identifies the related detail table and provides an indication of the basis of the relationship.

In another embodiment, a process may be configured to watch for the creation of aggregate tables, and for each aggregate table, provide an indication of the related detail table and the basis of the relationship to the detail table in a database. The facility can then inspect the data contained in this database to identify the aggregate tables that are associated with the detail table and are aggregations of the queried identifier. In still another embodiment, the facility can identify the aggregates tables that are associated with the detail table from definitions and/or metadata associated with the aggregate tables. For example, a tool may create metadata for each aggregate table, where the metadata includes data regarding the related detail table and the basis of the relationship with the detail table.

At step 1104, the facility discards the aggregate tables that are not suitable for use in answering the current distinct count query. For example, the facility discards the aggregate tables that are not aggregations of the queried identifier. At step 1106, the facility checks the aggregate tables that have not been discarded to determine if there is at least one aggregate table that contains the identifier that is being distinct counted. If there is at least one aggregate table that contains the identifier that is being distinct counted, then, at step 1108, the facility selects the aggregate table at the highest grain. If there is only one aggregate table (step 1106), then that aggregate table is the aggregate table at the highest grain. Stated another way, the facility selects the smallest aggregate table and continues processing the distinct count query using the selected aggregate table.

If no aggregate table contains the identifier being distinct counted, then, at step 1110, the facility checks the aggregate tables that have not been discarded to determine if there is at least one aggregate table that contains counts of the identifier that is being distinct counted. If there is at least one aggregate table that contains counts of the identifier that is being distinct counted, then, at step 1112, the facility selects the aggregate table at the highest grain and continues processing the distinct count query using the selected aggregate table. If there is only one aggregate table (step 1110), then that aggregate table is the aggregate table at the highest grain.

If no aggregate table contains counts of the identifier being distinct counted, then, at step 1114, the facility checks the aggregate tables that have not been discarded to determine if there is at least one aggregate table that contains distinct counts of the identifier that is being distinct counted. If there is at least one aggregate table that contains distinct counts of the identifier that is being distinct counted, then, at step 1116, the facility selects the aggregate table at the highest grain and continues processing the distinct count query using the selected aggregate table. If there is only one aggregate table (step 1114), then that aggregate table is the aggregate table at the highest grain.

Otherwise, if the facility is unsuccessful in identifying an aggregate table to use in answering the query, then the facility continues processing the distinct count query using the detail table.

From the foregoing, it will be appreciated that embodiments of the invention have been described herein for purposes of illustration, but that various modifications may be made without deviating from the spirit and scope of the invention. Accordingly, the invention is not limited except in accordance with elements explicitly recited in the appended claims.

We claim:

1. A method in a computing system for processing a distinct count query, wherein the computing system comprises a processor coupled to a memory and the method comprises:
   receiving a query requesting a distinct count of a detail table, wherein
      the query is received by the computing system,
      the detail table is stored in the memory,
      the query specifies an identifier type of the detail table,
      the query further specifies zero or more restrictions on dimensions of the detail table,
      each of the specified restrictions is a restriction on either an independent dimension or a dependent dimension,
      a first dimension is dependent on a second dimension if a value in the second dimension is associated with only one value in the first dimension, and
      each of the specified restrictions is at a particular level of its dimension;
   identifying an aggregate table corresponding to the detail table;
   determining, using the processor, whether rows of the identified aggregate table contain (1) identifiers of the specified type or (2) counts each indicating a number of unique identifiers of the specified type occurring in the detail table for different combinations of dimension values, each dimension value at a particular level of its dimension;
   if the rows of the identified aggregate table contain identifiers of the specified type:
      if the identifiers of the specified type each occur uniquely in the identified aggregate table, performing a plain count operation on the rows of the aggregate table satisfying the specified restrictions to obtain a result for the distinct count query;
      if the identifiers of the specified type do not each occur uniquely in the identified aggregate table, performing a distinct count operation on the rows of the aggregate table satisfying the specified restrictions to obtain a result for the distinct count query;
   if the rows of the identified aggregate table contain counts each indicating a number of unique identifiers of the specified type occurring in the detail table for different combinations of dimension values, each dimension value at a particular level of its dimension:
      for each specified restriction, determining whether the specified restriction is (1) on an independent dimension at the same level as the dimension values of the aggregate table, or (2) on a dependent dimension at the same level as the dimension values of the aggregate table or a higher level;
      if each specified restriction is either (1) on an independent dimension at the same level as the dimension values of the aggregate table, or (2) on a dependent dimension at the same level as the dimension values of the aggregate table or a higher level:
         summing the counts contained in the rows of the aggregate table whose dimension values satisfy all of the specified restrictions to obtain a result for the distinct count query; and
      if not every specified restriction is either (1) on an independent dimension at the same level as the dimension values of the aggregate table, or (2) on a dependent dimension at the same level as the dimension values of the aggregate table or a higher level:
         performing a distinct count operation on the rows of the detail table satisfying the specified restrictions to obtain a result for the distinct count query.

2. The method of claim 1, wherein the aggregate table is one of a plurality of aggregate tables, the aggregate table being at a highest grain of the plurality of aggregate tables.

3. The method of claim 1, wherein the identifying an aggregate table comprises using metadata associated with the aggregate table.

4. A computer-readable storage medium comprising computer executable instructions encoded therein, wherein the computer executable instructions are executable to cause a computer to:
   receive a query requesting a distinct count of an identifier of a detail table, the query specifying zero or more restrictions on dimensions of the detail table wherein
      each of the specified restrictions is a restriction on either an independent dimension or a dependent dimension,
      a first dimension is dependent on a second dimension if a value in the second dimension is associated with only one value in the first dimension;
   identify an aggregate table associated with the detail table;
   determine whether the aggregate table contains the identifier being distinct counted;
   if the aggregate table contains the identifier being distinct counted:
      determine whether the identifier is different in every row of the aggregate table; and
      if the identifier is different in every row of the aggregate table, perform a plain count operation on the rows of the aggregate table satisfying the specified restrictions to obtain a result for the distinct count query;

otherwise, perform a distinct count operation on the rows of the aggregate table satisfying the specified restrictions to obtain a result for the distinct count query;

otherwise, determine whether the rows of the aggregate table contain counts of the identifier being distinct counted, wherein each count of the counts indicates a number of times the identifier occurs in the detail table;

if the rows of the identified aggregate table contain counts of the identifier being distinct counted:

determine whether the aggregate table meets at least one of a plurality of conditions;

if the aggregate table meets a first condition of the plurality of conditions, wherein the first condition specifies that the aggregate table has dimensionality involving only dimensions dependent on the specified type being distinct counted, perform a first operation;

otherwise, if the aggregate table meets a second condition of the plurality of conditions, wherein the second condition specifies that the aggregate table has at least one dimension dependent on the identifier being distinct counted and at least one dimension independent of the identifier being distinct counted, perform a second operation;

otherwise, perform a third operation in response to determining that the aggregate table meets a third condition of the plurality of conditions, wherein the third condition specifies that the aggregate table has dimensionality involving only dimensions independent of the identifier being distinct counted;

otherwise, perform a distinct count operation.

5. The computer-readable storage medium of claim 4, wherein each of the restrictions is on dimensions of the detail table.

6. The computer-readable storage medium of claim 4, wherein each of the restrictions is at a particular level of its dimension.

7. The computer-readable storage medium of claim 4, wherein the aggregate table is one of a plurality of aggregate tables, the aggregate table being at a highest grain of the plurality of aggregate tables.

8. The computer-readable storage medium of claim 4, wherein the first operation comprises summing the counts contained in the rows of the aggregate table whose dimension values satisfy all of the specified restrictions to obtain a result for the distinct count query.

9. The computer-readable storage medium of claim 4, wherein the second operation comprises determining whether the query matches in level the level of the aggregate for the independent dimensions; and responsive to determining that the query matches in level the level of the aggregate for the independent dimension, summing the counts contained in the rows of the aggregate table whose dimension values satisfy all of the specified restrictions to obtain a result for the distinct count query.

10. The computer-readable storage medium of claim 4, wherein the third operation comprises using an aggregate count contained in the rows of the aggregate table whose dimension values satisfy all of the specified restrictions to obtain a result for the distinct count query only if the restrictions in the query match in level the level of the aggregate table exactly, otherwise, performing a distinct count operation.

11. A method in a computing system for obtaining a distinct count metric, wherein the computing system comprises a processor coupled to a memory and the method comprises:

receiving a query requesting a distinct count of an identifier of a detail table, the query specifying zero or more restrictions on dimensions of the detail table wherein the query is received by the computing system, the detail table is stored in the memory, each of the specified restrictions is a restriction on either an independent dimension or a dependent dimension, a first dimension is dependent on a second dimension if a value in the second dimension is associated with only one value in the first dimension;

identifying an aggregate table associated with the detail table;

responsive to identifying the aggregate table, determining whether the aggregate table contains the identifier being distinct counted;

determining, using the processor, whether the aggregate table contains the identifier being distinct counted;

if the aggregate table contains the identifier being distinct counted:

determine whether the identifier is different in every row of the aggregate table;

if the identifier is different in every row of the aggregate table, perform a plain count operation on rows of the aggregate table satisfying the specified restrictions to obtain a result for the distinct count query;

otherwise, perform a distinct count operation on the rows of the aggregate table satisfying the specified restrictions to obtain a result for the distinct count query;

otherwise, determine whether the rows of the aggregate table contain counts of the identifier being distinct counted, wherein each count of the counts indicates a number of times the identifier occurs in the detail table;

if the rows of the identified aggregate table contain counts of the identifier being distinct counted:

determine whether the aggregate table meets at least one of a plurality of conditions:

if the aggregate table meets a first condition of the plurality of conditions, wherein the first condition specifies that the aggregate table has dimensionality involving only dimensions dependent on the specified type being distinct counted, perform a first operation;

otherwise, if the aggregate table meets a second condition of the plurality of conditions, wherein the second condition specifies that the aggregate table has at least one dimension dependent on the identifier being distinct counted and at least one dimension independent of the identifier being distinct counted, perform a second operation, otherwise, perform a third operation in response to determining that the aggregate table meets a third condition of the plurality of conditions, wherein the third condition specifies that the aggregate table has dimensionality involving only dimensions independent of the identifier being distinct counted;

otherwise, perform a distinct count operation.

12. The method of claim 11, wherein each of the restrictions is on dimensions of the detail table.

13. The method of claim 11, wherein each of the restrictions is at a particular level of its dimension.

14. The method of claim 11, wherein the aggregate table is one of a plurality of aggregate tables, the aggregate table being at a highest grain of the plurality of aggregate tables.

15. The method of claim 11, wherein the first operation comprises summing the counts contained in the rows of the aggregate table whose dimension values satisfy all of the specified restrictions to obtain a result for the distinct count query.

16. The method of claim 11, wherein the second operation comprises determining whether the query matches in level the level of the aggregate for the independent dimensions; and
responsive to determining that the query matches in level the level of the aggregate for the independent dimensions; summing the counts contained in the rows of the aggregate table whose dimension values satisfy all of the specified restrictions to obtain a result for the distinct count query.

17. The method of claim 11, wherein the third operation comprises using an aggregate count contained in the row of the aggregate table whose dimension values satisfy all of the specified restrictions to obtain a result for the distinct count query only if the restrictions in the query match in level the level of the aggregate table exactly, otherwise performing a distinct count operation.

18. A system for obtaining a distinct count metric, the system comprising:
a query receipt component operable to receive a query requesting a distinct count of an identifier of a detail table, the query specifying zero or more restrictions on dimensions of the detail table, wherein
each of the specified restrictions is a restriction on either an independent dimension or a dependent dimension, and
a first dimension is dependent on a second dimension if a value in the second dimension is associated with only one value in the first dimension;
a distinct count metric component operable to:
identify an aggregate table associated with the detail table;
determine whether the aggregate table contains the identifier being distinct counted;
if the aggregate table contains the identifier being distinct counted:
determine whether the identifier is different in every row of the aggregate table; and
if the identifier is different in every row of the aggregate table, perform a plain count operation on rows of the aggregate table satisfying the specified restrictions to obtain a result for the distinct count query;
otherwise, perform a distinct count operation on the rows of the aggregate table satisfying the specified restrictions to obtain a result for the distinct count query;
otherwise, determining whether the rows of the aggregate table contain counts of the identifier being distinct counted, wherein each count of the counts indicates a number of times the identifier occurs in the detail table;
if the rows of the identified aggregate table contain counts of the identifier being distinct counted:
determine whether the aggregate table meets at least one of a plurality of conditions;
if the aggregate table meets a first condition of the plurality of conditions, wherein the first condition specifies that the aggregate table has dimensionality involving only dimensions dependent on the specified type being distinct counted, perform a first operation;
otherwise, if the aggregate table meets a second condition of the plurality of conditions, wherein the second condition specifies that the aggregate table has at least one dimension dependent on the identifier being distinct counted and at least one dimension independent of the identifier being distinct counted, perform a second operation;
otherwise, perform a third operation in response to determining that the aggregate table meets a third condition of the plurality of conditions, wherein the third condition specifies that the aggregate table has dimensionality involving only dimensions independent of the identifier being distinct counted;
otherwise, performs a distinct count operation;
a computer-readable storage medium configured to store the query receipt component and the distinct count metric component; and
a processor coupled to the computer-readable storage medium, wherein the processor is configured to operate the query receipt component and the distinct count metric component.

19. The system of claim 18, wherein the distinct count metric component is further operable to:
responsive to determining that the specified restrictions are each a restriction on a dependent dimension at the same or higher level as the dimension values of the aggregate table, sum the counts contained in the rows of the aggregate table whose dimension values satisfy all of the specified restrictions to obtain a result for the distinct count query.

20. The system of claim 18, wherein the distinct count metric component is further operable to:
responsive to determining that the specified restrictions are each either a restriction on a dependent dimension at the same or higher level as the dimension values of the aggregate table or a restriction on an independent dimension at the same level as the dimension values of the aggregate table; sum the counts contained in the rows of the aggregate table whose dimension values satisfy all of the specified restrictions to obtain a result for the distinct count query.

21. The system of claim 18, wherein the distinct count metric component is further operable to:
responsive to determining that the specified restrictions are neither a restriction on a dependent dimension at the same or higher level as the dimension values of the aggregate table or a restriction on an independent dimension at the same level as the dimension values of the aggregate table, use an aggregate count contained in the row of the aggregate table whose dimension values satisfy all of the specified restrictions to obtain a result for the distinct count query only if the restrictions in the query match in level the level of the aggregate table exactly.

* * * * *

UNITED STATES PATENT AND TRADEMARK OFFICE
CERTIFICATE OF CORRECTION

| | | |
|---|---|---|
| PATENT NO. | : 7,707,144 B2 | Page 1 of 1 |
| APPLICATION NO. | : 10/994905 | |
| DATED | : April 27, 2010 | |
| INVENTOR(S) | : Ashish Mittal et al. | |

It is certified that error appears in the above-identified patent and that said Letters Patent is hereby corrected as shown below:

In column 1, line 64, delete "or" and insert -- of --, therefor.

In column 18, line 46, in claim 11, delete "operation;" and insert -- operation, --, therefor.

In column 19, line 43, in claim 18, delete "on rows" and insert -- on the rows --, therefor.

In column 19, line 51, in claim 18, delete "determining" and insert -- determine --, therefor.

In column 20, line 17, in claim 18, delete "performs" and insert -- perform --, therefor.

Signed and Sealed this
Nineteenth Day of April, 2011

David J. Kappos
*Director of the United States Patent and Trademark Office*